United States Patent
Ng et al.

(10) Patent No.: US 6,963,951 B2
(45) Date of Patent: Nov. 8, 2005

(54) PARTITION RECOVERY METHOD

(75) Inventors: WeiLoon Ng, Singapore (SG); YingEe Yip, Singapore (SG); YongPeng Chng, Singapore (SG); Liza MuiCheng Chia, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 379 days.

(21) Appl. No.: 10/046,625

(22) Filed: Jan. 14, 2002

(65) Prior Publication Data

US 2002/0059498 A1 May 16, 2002

Related U.S. Application Data

(63) Continuation-in-part of application No. 09/901,501, filed on Jul. 9, 2001.
(60) Provisional application No. 60/218,024, filed on Jul. 12, 2000.

(51) Int. Cl.$^7$ ................................................ G06F 13/00
(52) U.S. Cl. ..................... 711/112; 711/161; 711/162; 711/170; 713/2
(58) Field of Search ................. 711/112, 161, 711/162, 170; 713/2

(56) References Cited

U.S. PATENT DOCUMENTS

| | | | | |
|---|---|---|---|---|
| 5,367,682 A | * | 11/1994 | Chang | 713/1 |
| 5,829,045 A | * | 10/1998 | Motoyama | 711/162 |
| 6,016,536 A | * | 1/2000 | Wu et al. | 711/173 |
| 6,112,303 A | * | 8/2000 | Stancil | 713/2 |
| 6,205,558 B1 | * | 3/2001 | Sobel | 714/15 |
| 6,560,701 B1 | * | 5/2003 | Berstis et al. | 713/2 |

FOREIGN PATENT DOCUMENTS

| | | | |
|---|---|---|---|
| KR | 1 103 894 A2 | * | 5/2001 |
| KR | 1 103 895 A2 | * | 5/2001 |

* cited by examiner

*Primary Examiner*—Reba I. Elmore
(74) *Attorney, Agent, or Firm*—Westman, Champlin & Kelly, P.A.

(57) ABSTRACT

There is provided a method and system of maintaining partition information relating a computer disc drive. The method includes detecting partition information which is located in the first sector of a partition of a disc drive and determining if it is valid, and comparing the valid partition information with a corresponding duplicate of the partition information which is located in a reserved area. For valid partition information which is the same as the corresponding duplicate of the partition information, a standard booting procedure for the computer is allowed to continue. For valid partition information which is not the same as the corresponding duplicate partition information, valid partition information is stored in the reserved area. For partition information which is not valid, the invalid partition information is replaced with corresponding duplicate partition information which is valid.

18 Claims, 3 Drawing Sheets

PARTITION RECOVERY METHOD

RELATED APPLICATIONS

This application is related to and claims priority from U.S. Provisional Application Ser. No. 60/218,024, filed on Jul. 12, 2000, and is also a Continuation-in-Part of U.S. patent application Ser. No. 09/901,501 filed on Jul. 9, 2001.

FIELD OF THE INVENTION

This invention relates to partition recovery. It relates particularly but not exclusively to a method of maintaining partition information relating to a disc drive and to a system for maintaining information relating to partitions in disc drives.

BACKGROUND OF THE INVENTION

Personal computers (PCs) are used commonly in the fields of business, finance, academia and industry and in the home. The prevalence of PCs has become such that users are growing increasingly dependent on the inbuilt reliability of their computers. This has resulted in users becoming complacent when maintaining data and system files and creating "back up" records. Furthermore, users often expect inbuilt retrieval systems to exist which facilitate reconstruction of the records if a system failure occurs.

In general, PCs include at least one disc drive which is used to store the system's operating system software and data files which are created and manipulated in everyday use. In a typical disc drive, data is recorded in a plurality of generally circular concentric tracks on the surfaces of one or more discs. The discs are axially aligned and mounted to a hub of a spindle motor for rotation. An array of vertically aligned read/write heads are configured to write to or read from the disc surfaces. During seek operations, the read/write heads are controllably moved from track to track by an actuator assembly, so that data can be written to or read from different concentric tracks.

Along each track, data is stored in addressable sectors. A typical format usually includes a Master Boot Record (MBR) located at the very first address, Logical Block Address 0 (LBA0), of the disc. The MBR is accessed by the host system when it is powered or "booted" up and contains a partition table which points to primary partitions on the disc drive.

A disc drive can be arranged such that it contains up to four primary partitions, each of which can be pointed to by the MBR. However, some operating systems restrict partitioning of the disc drive such that there is only one primary partition. Extended partitions may be defined if necessary. Furthermore, each primary or extended partition can be subdivided into logical partitions.

The MBR contained in the primary partition references the location of other primary partitions on the disc drive, and the next adjacent extended partition. An Extended Master Boot Record (EMBR) is located in the first sector of each extended partition, and provides the location of the next extended partition on the disc. Extended partitions contain a boot sector (beginning in the second sector in the partition) in addition to File Allocation Tables (FATs) which are also referenced by the EMBR.

In addition to the partition tables, the MBR contains code which is loaded into the random access memory (RAM) of the computer using the ROM-BIOS (read only memory Basic Input/Output System) and which is responsible for the installation of the operating system when the power is switched on. The ROM-BIOS generally contains an instruction at its first address location which instructs the system to read the MBR of the first primary partition which subsequently results in the retrieval of code from the boot sector of that partition. The boot sector instructs the computer to load the operating system software, which is generally stored in system files and data files in the primary partition, into the RAM. Control is then transferred to the operating system which coordinates and controls the functions of the computer's central processing unit (CPU) and peripheral devices.

FATs keep track of files which are stored in partitions on the disc drive. The FATs also maintain a set of attributes for each file, such as whether the file is one of a system data set, whether it should remain hidden in the directory display, whether it should be archived the next time that the disc is backed up and whether the file is read only, in addition to a date and time stamp which stipulates when the file was created or last changed. When files are stored, they are placed in sectors on the disc. Many files will not fit into a single sector, and the number of sectors which is required to store a file may not be available in adjacent sectors in the partition. Hence the file will need to be stored in sectors which are dispersed throughout the partition in different tracks. Furthermore, as additional files are created, deleted and modified, they change in length and may require the use of extra sectors, or may free up one or more sectors.

The FAT provides a record of the locations of the dispersed sectors which are used to store each file, enabling the operating system to retrieve file data from these dispersed sectors and reconstruct the files accordingly. This method of file storage is spatially efficient as the sector size can be designated such that it is not so large that space is frequently wasted on small files, or so small that many sectors are required to store each file and time is wasted while the disc heads continually move to access the next sector in the file. However, files are often divided up into pieces and scattered all over the disc, and in time the partition becomes fragmented.

Although disc drive fragmentation and non-contiguous storage of file clusters is usually transparent to the user, they can result in slower file retrieval times. This is because the read operations may be interrupted by seek operations when the actuator assembly moves the read/write heads to another track to read the sector storing the next file cluster. Disc drive fragmentation therefore places an extra load on the system as the read/write heads must make many accesses to different locations or to different tracks in one partition in order to reconstruct a single file. Consequently, system crashes may occur more frequently.

Defragmentation and optimization software utilities are available with most operating systems, but computer users who are not familiar with the physical structure and use of their disc drives rarely consider the importance of frequent defragmentation or disc optimization.

Occasionally, system errors occur, wherein a FAT is corrupted or destroyed. Ordinarily, this would mean that data which was stored on the disc would be irretrievably and permanently lost. However, the importance of the FAT in data recovery has been recognized, and system developers have designed disc drives which maintain a copy of each FAT in a partition. It has been shown that the probability of both copies of a FAT being corrupted by the same system error is minimal; hence the duplicate storage method is sufficient for repairing damage done to a partition as a result of a system error. No such precautions have been taken with the MBR or EMBRs.

Because each primary partition is pointed to directly by the MBR, the consequence of a corrupt primary partition table in any partition other than the first primary partition is not deleterious to any primary partition which lies outside of that partition. The remaining primary partitions each contain their own MBR which is referenced by the partition information in the MBR of the first primary partition. As a result, each primary partition may be referenced independently of other primary partitions. If the partition table for the first primary partition can be recovered, its file system can be restored, and in the meantime, the remaining primary partitions will still be functional. However, many operating systems, when installed on a PC, prevent the structuring of a disc drive such that there is more than one primary partition. Since the existence of only one primary partition means that only one partition can be referenced by the MBR when the system is booted up, only one operating system can control the CPU (since a system cannot be booted from an extended or logical partition). Software is available which overrides these limitations, but the regular user of a PC is not likely to use it to create more than one primary partition on their disc drive.

The limitation of having only one primary partition per disc drive does not affect most computer users in an adverse manner, as extended partitions can still be allocated in the disc drive, facilitating organized filing habits and data storage. However, the MBR cannot reference more than one extended partition directly from LBA0. Instead, the MBR is provided with a reference to the boot sector of the primary partition and the EMBR of the first extended partition. The EMBR of the first extended partition provides a reference to the EMBR of the second extended partition, which similarly provides a reference to the EMBR of the third (and final) extended partition.

The difficulty with the system, as it presently exists, is that the corruption or destruction of the MBR in operating systems where only one primary partition is permitted results in a loss of all references to other partitions in the disc drive. That is, because of the forward-linked nature of the MBR and EMBRs, the MBR is the only record which is able to determine the location of partition tables and subsequent FATs situated anywhere on the hard drive. Although duplicates are made of all FATs, they cannot be referenced without the MBR (or EMBR in extended partitions) which directs the operating system to the location of these FATs. Current systems provide backup MBRs which effectively reinstall the MBR using an auxiliary device such as floppy disc drive or a CD-ROM drive, but this method is ineffective if the structure of the disc drive has been altered since the back-up MBR was created (e.g. if the disc drive has been reformatted and no back-up created). Furthermore, reinstallation of the MBR requires significant user-intervention. Similarly, destruction of an EMBR results in loss of all references to other extended partitions which are referred to, either directly or indirectly, by that EMBR.

What the prior art is missing is a method of maintaining partition information in a disc drive that requires minimal user intervention.

SUMMARY OF THE INVENTION

A preferred embodiment of the present invention includes a method of maintaining partition information relating to a disc drive. The method includes detecting partition information which is located in the first sector of a partition of the disc drive and determining if it is valid. The valid partition information is compared with a corresponding duplicate of the partition information which is located in a reserved area. For valid partition information which is the same as the corresponding duplicate of the partition information, the computer continues with a standard booting procedure. For valid partition information which is not the same as the corresponding duplicate partition information, the method involves storing the valid partition information in the reserved area. For partition information which is not valid, the invalid partition information is replaced with corresponding duplicate partition information which is valid.

Duplicates of original partition information are created to ensure that if original partition information is found to be invalid, a backup version is available with which partition tables and subsequent file allocation tables and system and data files can be recovered.

In another embodiment of the present invention, there is provided a system for maintaining information relating to partitions in disc drives. The system includes at least one disc drive and firmware for controlling the initialization of the computer and its peripheral devices. Upon application of power to the disc drive, instructions embodied in the firmware are executed upon detection of invalid partition information, redirecting the system to seek valid partition information.

These and various other features as well as advantages which characterize the present invention will be apparent upon reading of the following detailed description and review of the associated drawings.

DETAILED DESCRIPTION

Figure 1:
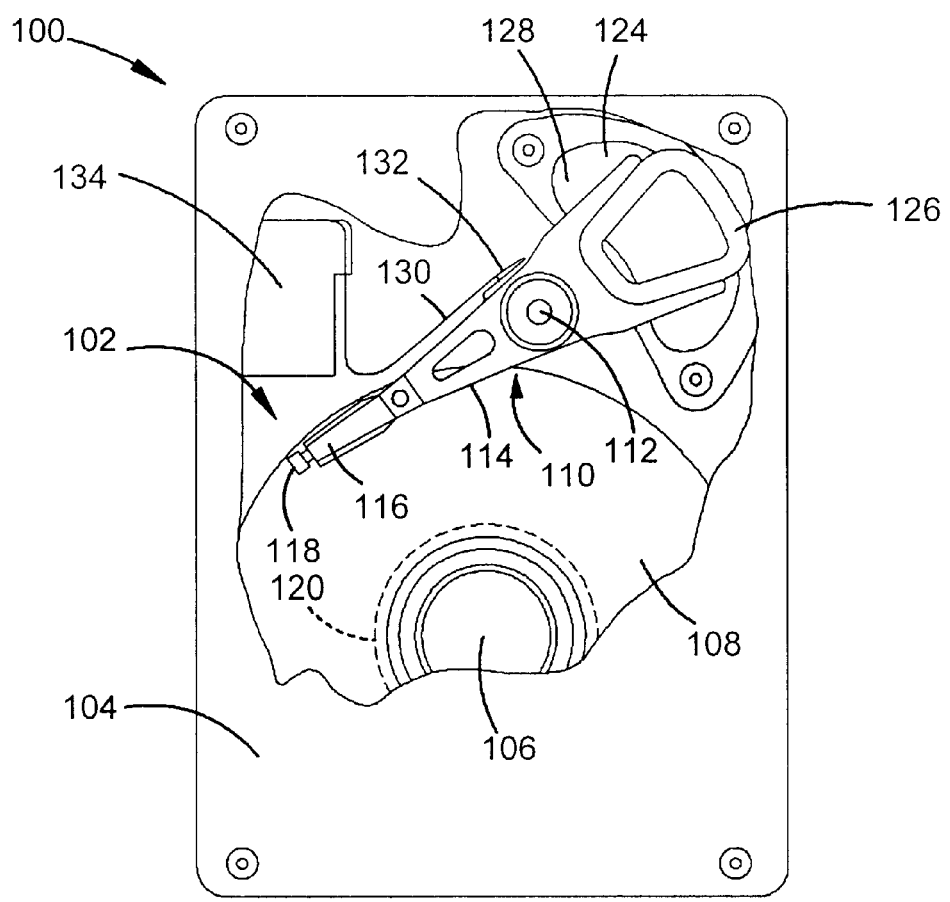
FIG. 1 is a top view of an exemplary disc drive in which preferred embodiments of the present invention are implemented.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Storage space on a disc 108 may be divided into partitions. Partition information that is located at the lowest logical base address (LBA0) of a first partition of the disc drive 100 is generally referred to as the Master Boot Record (MBR). The MBR contains a program which searches the MBR partition table for the location of the partition containing a boot sector which is to be used for initializing the operating system of the host system. The MBR is located in a primary partition on the disc drive, which also contains the system files and data files which are necessary for the installation of the operating system into the Random Access Memory (RAM). The MBR also contains a reference to all other primary partitions which are located on the disc drive, and the location of the first adjacent extended partition. The first extended partition whose location follows the primary partition, and each subsequent extended partition thereafter, contains a partition table in the first sector known as the extended MBR (EMBR). The EMBR provides a reference to the boot sector and File Allocation Tables (FATs) within that partition in addition to the starting location of the next extended partition.

The Basic Input/Output System (BIOS) controls the initialization of the host system and its peripheral devices, although in some cases it can be bypassed and other devices can be used to initialize the system. The BIOS may be embodied in the firmware in the form of an erasable programmable read only memory (EPROM). The instructions embodied by the firmware may be in the form of assembly language code which enables the firmware to interact with the disc drive and other peripheral devices connected to the host system.

In a booting up process, the BIOS instructs the host system to load the operating system from the disc drive into the RAM of the host system. This is achieved by handing control from the BIOS to a boot sector, located using the partition table which is contained in the MBR of the first partition on the disc drive. The system files to which the boot sector refers are then loaded into the RAM. The MBR thus contains the first piece of code that a host system interprets, after the BIOS has initiated the disc drive upon power-up.

The present invention complements existing boot procedures by assessing the validity of the partition information, prior to the installation of the operating system into the RAM. The BIOS is used to execute commands which determine the validity of partition information contained in the MBR which is the partition record located in the very first sector of the first partition of the disc drive and partition information contained in the first sector of other partitions in the disc drive.

Figure 2:
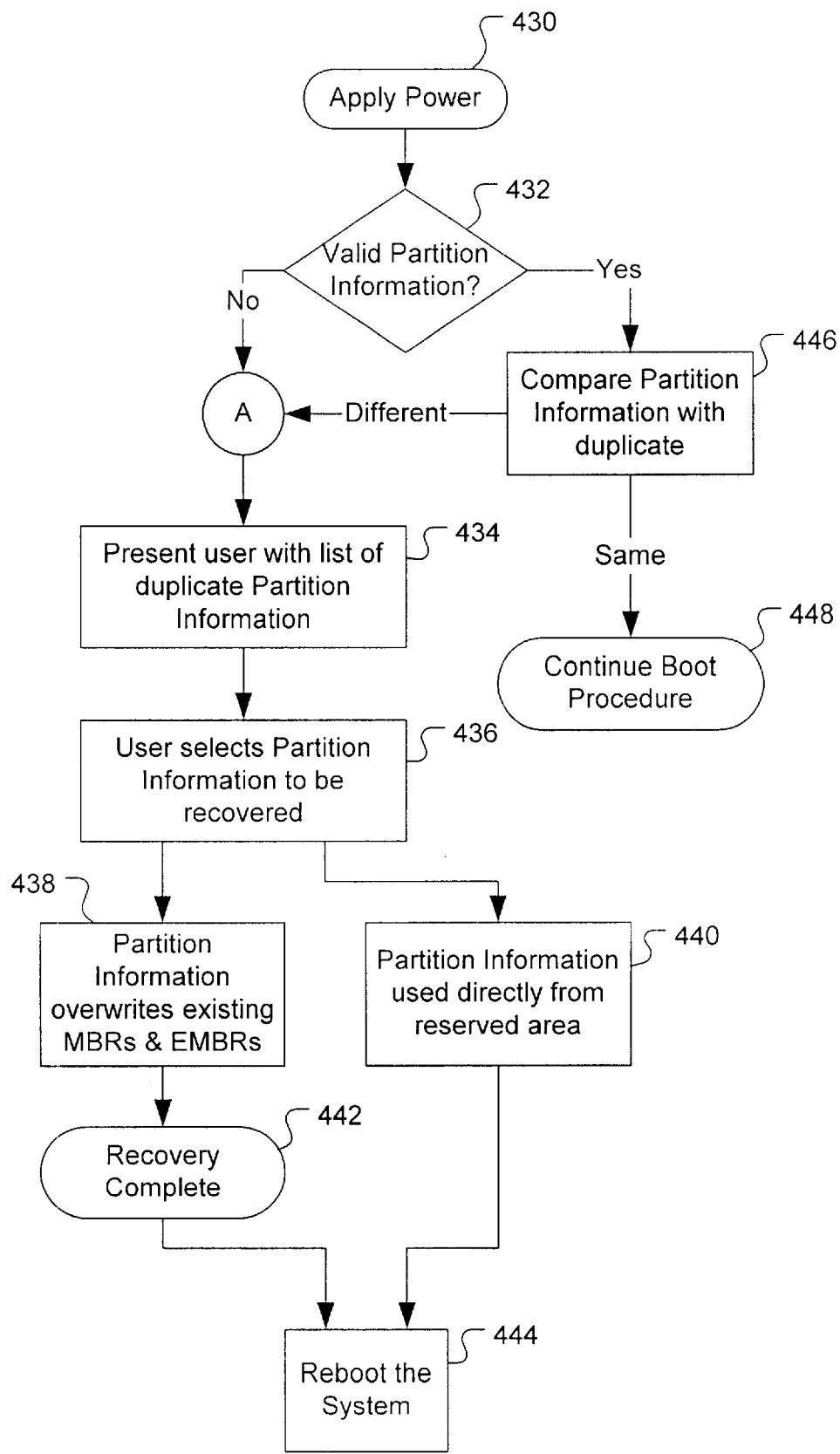
FIG. 2 is a flow diagram of a process according to a preferred embodiment of the present invention.

FIG. 2 illustrates a process in which partition information is maintained according to preferred embodiments of the present invention. The system is powered up in step 430 and the validity of the partition information which is located in the first sector of each partition on the disc drive is determined prior to the operating system software being installed into the RAM as shown in step 432. This partition information is contained in the MBR of primary partitions and the EMBR of extended partitions. The partition information is validated preferably by executing a subroutine which is stored in firmware, such as the BIOS. Partition information which is not valid includes nonsensical information (for example, refers to sectors or partitions which do not exist) and corrupt partition information. Preferably, viruses such as boot-record infectors which are stored with the partition information and affect the boot process can also be identified during the validation process 432.

If the partition information contained in the MBR and EMBR is found to be valid, it is then compared with duplicate partition information which has been stored in a reserved area, as in step 446. It is preferred that the reserved area is located on the disc drive, and is an area which is not used to store system or data files in the usual everyday use of the disc drive. Alternatively, the reserved area may be any other area which is capable of storing partition information, including firmware. It is also preferred that the reserved area is equally divided by the number of partitions into which the disc drive is divided. As an alternative embodiment, there may be partitions on the disc drive for which there is very little partition information and as a consequence, the reserved sub-area for that partition may be less than is required for other partitions.

If the partition information which is located in the first sector of each partition matches the duplicate partition information which is located in the corresponding reserved sub-area, system control is handed back to the BIOS which subsequently hands over to the MBR which locates the boot sector for the operating system and the standard boot process continues, as illustrated by step 448.

If the partition information which is located in the first sector of a partition is valid but does not match the duplicate partition information which is located in the corresponding reserved sub-area, this suggests that the partition information in the MBR or EMBR has changed since the last time the host system was booted. This change may be the result of several actions. For example, the host system may have been booted from a floppy disc and an alternative operating system may have been installed resulting in a consequent change in the contents of the MBR. In some cases, the disc drive may have been re-formatted and the partition information contained in the MBR or an EMBR was altered. There is also the possibility that a system error occurred, and the partition information was corrupted.

In such cases, and in the case where any partition information is found to be invalid, the BIOS may be programmed to instruct the user to insert a partition recovery program into a peripheral device. Recovery of the partition information can take place and the system rebooted.

According to preferred embodiments of the present invention, the floppy disc inserted by the user is used to instruct the computer to retrieve valid duplicates of the partition information from the reserved area.

Upon retrieval of the duplicate partition information, the user is presented with a list of the duplicate partition information and is prompted to select which partition information is to be recovered, as in step 434. The user selects the partition information to be recovered (step 436) and the duplicate partition information then replaces the invalid partition information which was located in the MBR and/or EMBR (step 38). Recovery can be completed by overwriting the existing MBR and EMBR with the partition information taken from the reserved area 442. In addition, using the partition information that is retrieved from the reserved area, the system can be rebooted 444.

In alternative preferred embodiments, upon the BIOS detecting invalid partition information in the MBR or EMBR 432, the BIOS itself executes instructions which result in the retrieval of the duplicate partition information.

Figure 3:
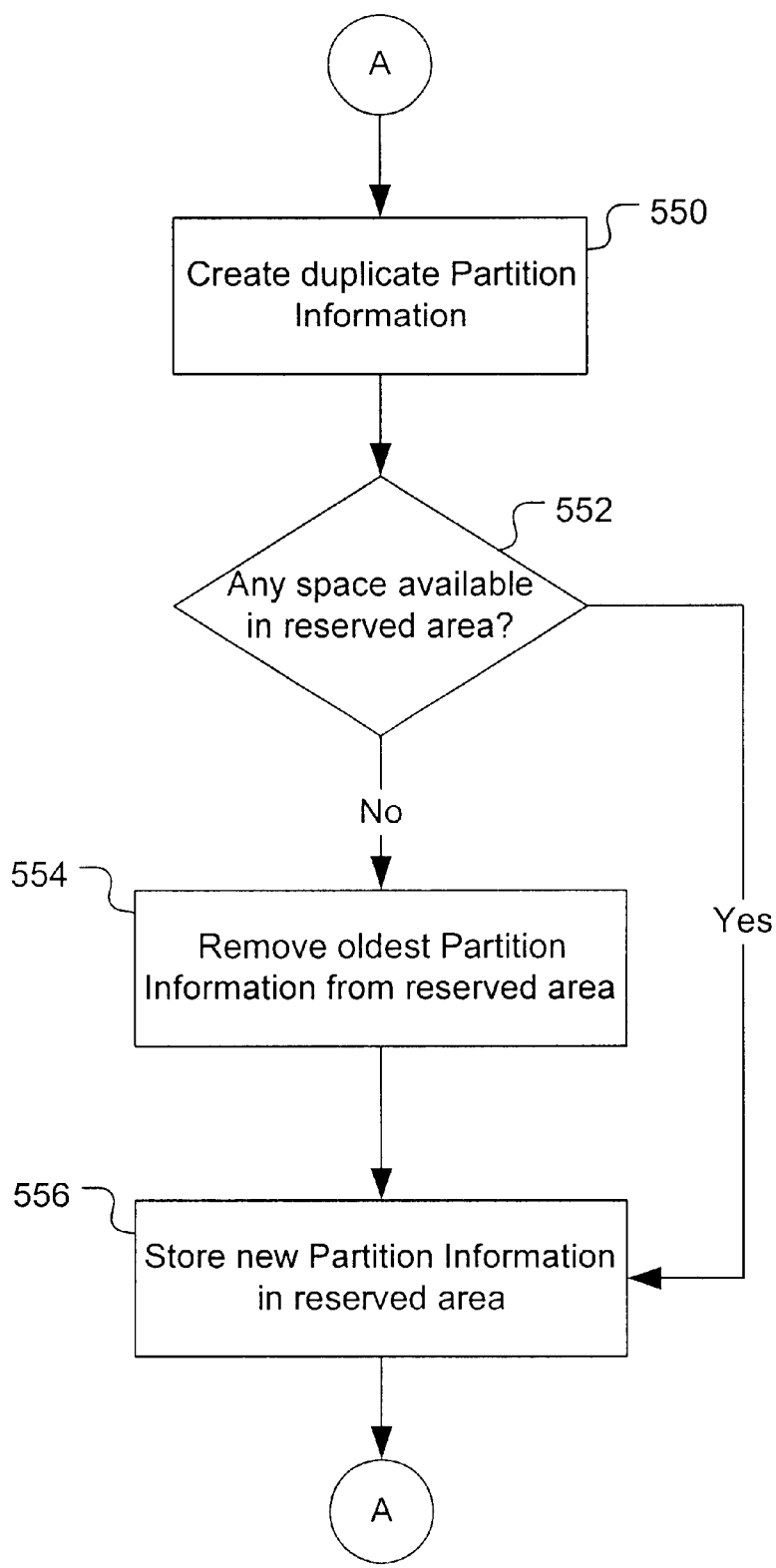
FIG. 3 is a flow diagram illustrating an alternative embodiment of the present invention.

Another preferred embodiment is described with the aid of the flow chart in FIG. 3. On detecting non-matching original and duplicate partition information 446, a copy of the new partition information is stored in the reserved area (as in step 550). If the reserved area is full 552, it is preferable that the oldest corresponding partition information is deleted to create sufficient space for the new partition information 554. The new partition information can then be stored in the reserved area 556. If there is space in the reserved area for the new partition information without deleting the older partition information 552, the new partition information can be stored without first deleting an older version of the partition information 556.

Referring again to FIG. 2, the user is then presented with a list of the duplicate partition information which has been stored in the reserved area (step 434). Again, this can be achieved using a commercially available partition table recovery program. Preferably, this is achieved by executing a code stored in the BIOS which presents a list of the duplicate partition information which has been stored in the reserved area to the user so that the level of user interaction is minimized.

It is preferred that the duplicate partition information is appended with the date on which it was stored. This enables the user to assess the duplicate partition information and determine which partition information should be recovered and installed back into the MBR or EMBR. The user may select the earliest valid duplicate of the partition table which was stored 436, since a later duplicate will most likely have been affected. After the user has selected the desired partition information, the selected partition information replaces the partition information in the MBR or the EMBR 438 in the recovery process 442. The system is also rebooted using the selected partition information 440.

If the disc drive was reformatted such that there were partitions either created or destroyed, it is possible that the partition information may have been invalid. Thus, in one embodiment of the present invention, upon reformatting the disc drive, the duplicate partition information is updated, ensuring that the latest version of the partition information can be recovered, should a system error occur which affects the original partition information.

This system and method provides a back up and recovery of the partition information that requires relatively less user intervention.

Alternatively, embodiments of the present invention may be described as follows:

The present invention provides for a method and system of maintaining partition information relating a disc drive 100. When power is applied to the disc drive 430, partition information which is located in the first sector of a partition of a disc drive is detected and determined if it is valid 432. The valid partition information is compared with a corresponding duplicate of the partition information which is located in a reserved area 446. For valid partition information which is the same as the corresponding duplicate of the partition information, the method involves continuing a standard booting procedure for the computer 448. For valid partition information which is not the same as the corresponding duplicate partition information, the method involves storing the valid partition information in the reserved area 456. For partition information which is not valid, the method involves replacing the invalid partition information with partition information which is valid 438.

The invalid partition information may include partition information which is corrupt, missing, or has been deleteriously altered by a virus. In one embodiment, the reserved area is a dedicated area on the disc which is reserved for the purpose of storing duplicate partition information and which is equally divided by the number of partitions which exist on the disc drive. Alternatively, the reserved area may be located on firmware. The duplicate partition information may be appended with the date on which it was created. If no space is available in the reserved area, the method can include steps of removing the oldest duplicate partition information from the reserved area 554 and storing the newest duplicate partition information therein 556. In one embodiment, where the partition information is not valid, it is replaced by corresponding duplicate partition information which is valid and which is stored in the reserved area 438. The user may be presented with a list of duplicate partition information 434, and the user selects the version of corresponding duplicate partition information which will replace the invalid partition information 436. The instructions which result in the presentation of the duplicate partition information to the user may be contained in a storage medium which is read using a peripheral device, or firmware such as the BIOS.

It is to be understood that the foregoing disclosure is illustrative only, and changes may be made within the principles of the present invention to the full extent indicated by the broad general meaning of the terms in which the appended claims are expressed. Although the preferred embodiment described herein is directed to a disc drive for a personal computer, it will be appreciated by those skilled in the art that the teachings of the present invention can be applied to other systems without departing from the scope and spirit of the present invention.

What is claimed is:

1. A method of maintaining partition information relating a disc drive, the method comprising steps of, when the disc drive has power applied to it:

(a) detecting partition information which is located in the first sector of a partition of the disc drive and determining if it is valid;

(b) comparing the valid partition information with a corresponding duplicate of the partition information which is located in a reserved area;

(c) for valid partition information which is the same as the corresponding duplicate of the partition information, continuing a standard booting procedure for the disc drive;

(d) for valid partition information which is not the same as the corresponding duplicate partition information, storing the valid partition information in the reserved area; and (e) for partition information which is not valid, replacing the invalid partition information with partition information which is valid.

2. The method according to claim 1 in which the detecting step (a) includes determining partition information which is corrupt, is missing, or has been deleteriously altered by a virus.

3. The method according to claim 1 further comprising a step (f) of providing a dedicated area on a disc of the disc drive reserved for the purpose of storing duplicate partition information in which the dedicated area is equally divided by the number of partitions which exist on the disc drive.

4. The method according to claim 1 further comprising a step (f) of providing the reserved area on firmware.

5. The method according to claim 1 wherein the duplicate partition information is appended with the date on which it was created.

6. The method according to claim 1 in which, if no space is available in the reserved area, the step (d) further comprises steps of:

(f) removing the oldest duplicate partition information from the reserved area; and (g) storing the newest duplicate partition information therein.

7. The method according to claim 1 wherein partition information which is not valid is replaced by corresponding duplicate partition information which is valid and which is stored in the reserved area.

8. The method according to claim 1 wherein the user is presented with a list of duplicate partition information which has been appended with the date on which it was created and which is stored in the reserved area, and the user selects the version of corresponding duplicate partition information which will replace the invalid partition information.

9. The method according to claim 8 further comprising a step of executing instructions which results in the presentation of the duplicate partition information to the user, in which the instructions are contained on a disc of the disc drive or on firmware.

10. A system for maintaining information relating to partitions in disc drives associated with a computer, the system comprising:

at least one disc drive;

firmware controlling the initialization of the computer and its peripheral devices; and instructions installed on the firmware which are executed upon detection of invalid partition information, the instructions redirecting the system to seek valid partition information, by:

(a) detecting partition information which is located in the first sector of a partition of the disc drive and determining if it is valid;

(b) comparing the valid partition information with a corresponding duplicate of the partition information which is located in a reserved area;

(c) for valid partition information which is the same as the corresponding duplicate of the partition information, continuing a standard booting procedure for the disc drive;

(d) for valid partition information which is not the same as the corresponding duplicate partition information, storing the valid partition information in the reserved area; and (e) for partition information which is not valid, replacing the invalid partition information with partition information which is valid.

11. The system according to claim 10 wherein the disc drive is divided into one or more partitions, each partition containing partition information which relates to the use of sectors within that partition and the location of at least one other partition which is located elsewhere on the disc drive.

12. The system according to claim 10 wherein the firmware controlling the initialization of the computer is a programmable read only memory device.

13. The system according to claim 10 wherein the firmware controlling the initialization of the computer executes Basic Input/Output System (BIOS) software.

14. The system according to claim 13 wherein the BIOS contains instructions for determining the validity of partition information which is located in the first sector of each partition in the disc drive.

15. The system according to claim 14 wherein the BIOS contains further instructions which are executed upon detection of invalid partition information, the instructions comprising:

(h) redirecting the system to a reserved area wherein for each partition in the disc drive, a duplicate of valid partition information has been stored;

(i) presenting the user with duplicates of the valid partition information;

(j) enabling the user to select one of the duplicates of the valid partition information which will replace invalid partition information;

(k) replacing the invalid partition information with the valid duplicate partition information which has been selected by the user; and (l) rebooting the computer, using the replaced partition records.

16. A disc drive comprising:

a disc;

a set of partition information describing usage allocation on the disc; and means for maintaining the set of partition information, comprising:

(a) means for detecting partition information which is located in the first sector of a partition of the disc drive and determining if it is valid;

(b) means comparing the valid partition information with a corresponding duplicate of the partition information which is located in a reserved area;

(c) means for valid partition information which is the same as the corresponding duplicate of the partition information, continuing a standard booting procedure for the disc drive;

(d) means for valid partition information which is not the same as the corresponding duplicate partition information, storing the valid partition information in the reserved area; and (e) for partition information which is not valid, replacing the invalid partition information with partition information which is valid.

17. The disc drive of claim 16 in which at least one backup copy of the set of partition information is retained in the disc drive.

18. The disc drive of claim 17 in which the means for maintaining the partition information further includes an executable set of instructions to replace the set of partition information with the or one of the backup copies.

* * * * *